US012188396B2

(12) United States Patent
Gong et al.

(10) Patent No.: US 12,188,396 B2
(45) Date of Patent: Jan. 7, 2025

(54) SYSTEMS AND METHODS FOR REACTIVE REGENERATION OF SELECTIVE CATALYTIC REDUCTION CATALYSTS

(71) Applicant: CUMMINS EMISSION SOLUTIONS INC., Columbus, IN (US)

(72) Inventors: Jinqian Gong, Columbus, IN (US); Anurag Kumra, Columbus, IN (US)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 346 days.

(21) Appl. No.: 17/781,040

(22) PCT Filed: Nov. 24, 2020

(86) PCT No.: PCT/US2020/061968
§ 371 (c)(1),
(2) Date: May 30, 2022

(87) PCT Pub. No.: WO2021/113119
PCT Pub. Date: Jun. 10, 2021

(65) Prior Publication Data
US 2023/0003151 A1 Jan. 5, 2023

Related U.S. Application Data

(60) Provisional application No. 62/943,328, filed on Dec. 4, 2019.

(51) Int. Cl.
*F01N 3/00* (2006.01)
*B01D 53/94* (2006.01)
(Continued)

(52) U.S. Cl.
CPC ......... *F01N 3/208* (2013.01); *B01D 53/9418* (2013.01); *B01D 53/9495* (2013.01);
(Continued)

(58) Field of Classification Search
CPC ................ F01N 3/208; F01N 3/2006; F01N 2900/1602; F01N 3/021; F01N 3/106;
(Continued)

(56) References Cited

U.S. PATENT DOCUMENTS

| 8,739,517 B2 * | 6/2014 | Xu ........................... F01N 3/208 60/303 |
| 9,091,189 B2 | 7/2015 | Zeng et al. |

(Continued)

FOREIGN PATENT DOCUMENTS

FR 3020411 A1 * 10/2015 ............. F01N 3/023

OTHER PUBLICATIONS

First Examination Report in Indian Appl. No. 202041027929, dated Feb. 22, 2022.
International Search Report and Written Opinion in PCT Appl. No. PCT/US2020/061968, mailed Feb. 19, 2021.

*Primary Examiner* — Matthew T Largi
(74) *Attorney, Agent, or Firm* — Foley & Lardner LLP

(57) ABSTRACT

A controller for controlling regeneration of a selective catalytic reduction (SCR) catalyst of an aftertreatment system is configured to cause increase in a SCR catalyst temperature of the SCR catalyst to a first regeneration temperature, the first regeneration temperature being lower than a high regeneration temperature that is equal to or greater than 500 degrees Celsius. The controller is configured to determine an amount of ammonia slip downstream of the SCR catalyst; and cause an increase in the SCR catalyst temperature to a second regeneration temperature greater than the first regeneration temperature but lower than the high regeneration temperature based on the determined amount of ammonia slip.

21 Claims, 8 Drawing Sheets

(51) Int. Cl.
*B01J 38/02* (2006.01)
*F01N 3/20* (2006.01)

(52) U.S. Cl.
CPC ............ *B01J 38/02* (2013.01); *F01N 3/2006* (2013.01); *F01N 2900/1602* (2013.01)

(58) Field of Classification Search
CPC ............... F01N 2570/18; F01N 3/2066; F01N 2260/04; F01N 2560/021; F01N 2560/026; F01N 2900/1404; B01D 53/9418; B01D 53/9495; B01D 2251/208; B01D 2255/2065; B01D 2255/20723; B01D 2255/2073; B01D 2257/404; B01D 53/9431; B01D 53/9477; B01D 2251/2067; B01D 2255/1021; B01D 2255/1023; B01D 2255/1025; B01D 2255/20738; B01D 2255/20761; B01D 2257/406; B01D 2257/502; B01J 38/02
See application file for complete search history.

(56) References Cited

U.S. PATENT DOCUMENTS

| | | | |
|---|---|---|---|
| 2010/0043397 A1* | 2/2010 | Wang | F01N 11/007 60/276 |
| 2011/0023456 A1* | 2/2011 | Levijoki | F01N 3/208 60/277 |
| 2011/0094209 A1* | 4/2011 | Charial | F01N 3/208 703/2 |
| 2011/0167805 A1* | 7/2011 | Chen | F01N 3/023 60/286 |
| 2011/0219747 A1 | 9/2011 | Geveci et al. | |
| 2011/0265457 A1* | 11/2011 | Sato | F02M 26/15 60/285 |
| 2013/0104637 A1* | 5/2013 | Kowalkowski | F01N 3/2066 73/114.71 |
| 2016/0131010 A1 | 5/2016 | Mitchell et al. | |
| 2017/0101913 A1 | 4/2017 | Zapf et al. | |
| 2017/0333844 A1* | 11/2017 | Zeng | B01D 53/9495 |
| 2019/0063289 A1 | 2/2019 | Yi et al. | |

* cited by examiner

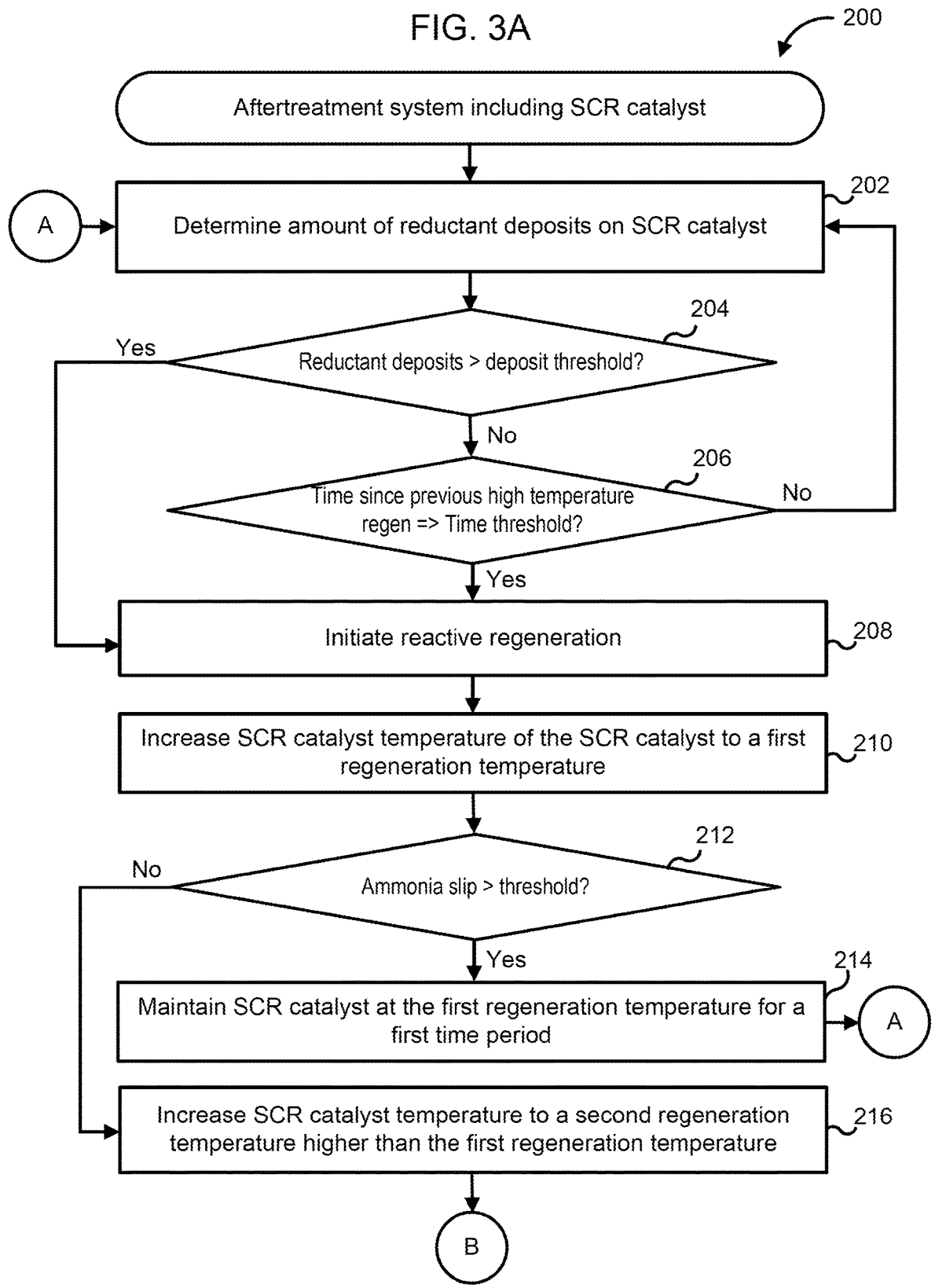

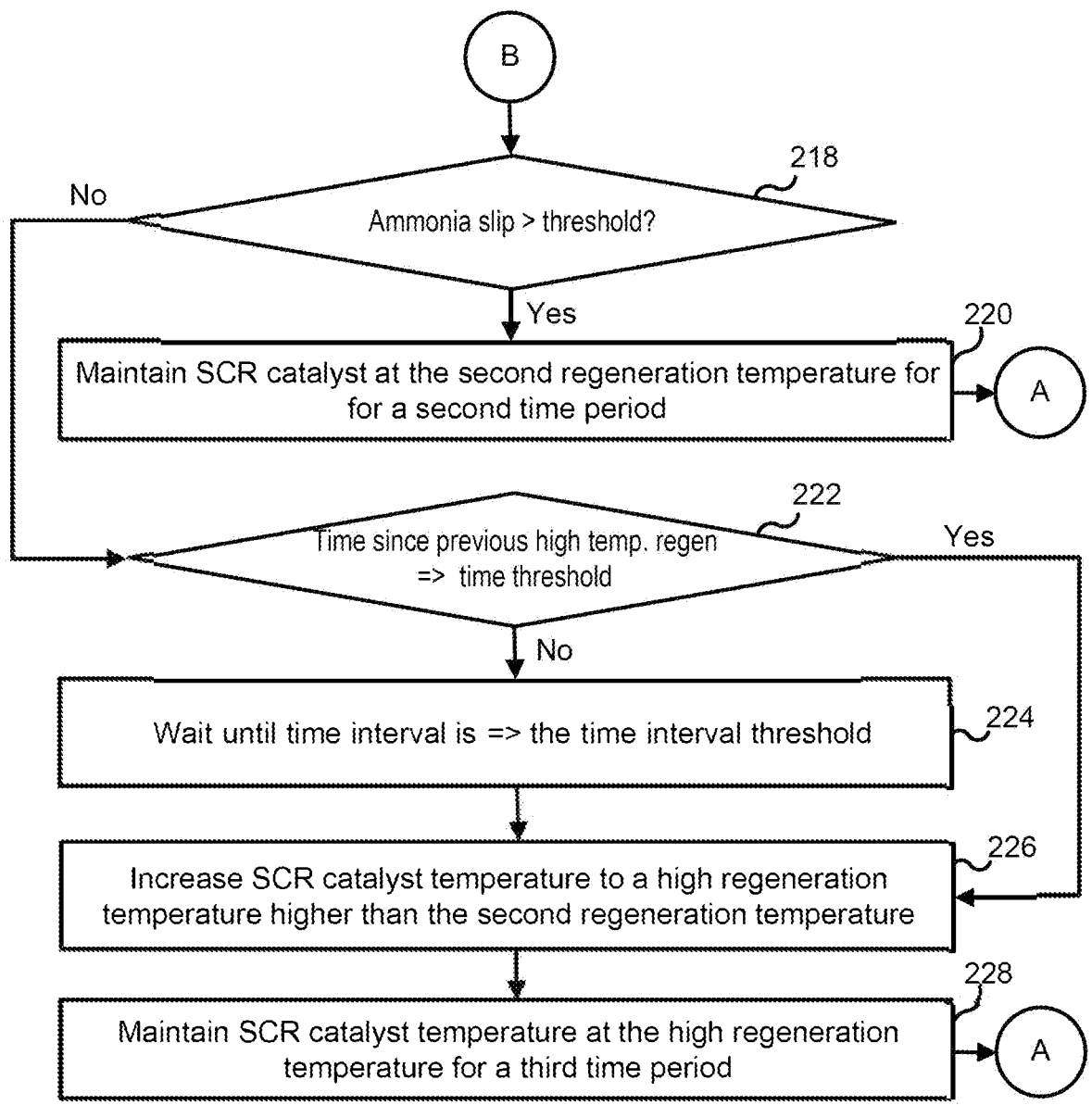

SYSTEMS AND METHODS FOR REACTIVE REGENERATION OF SELECTIVE CATALYTIC REDUCTION CATALYSTS

CROSS-REFERENCE TO RELATED APPLICATIONS

This application is a national phase application based on PCT Application No. PCT/US2020/061968, filed Nov. 24, 2020, which claims the benefit of and priority to U.S. Provisional Application No. 62/943,328, filed Dec. 4, 2019. The contents of these applications are incorporated by reference in their entireties.

TECHNICAL FIELD

The present disclosure relates generally to aftertreatment systems for use with internal combustion (IC) engines.

BACKGROUND

Exhaust gas aftertreatment systems are used to receive and treat exhaust gas generated by engines such as IC engines. Conventional exhaust gas aftertreatment systems include any of several different components to reduce the levels of harmful exhaust emissions present in exhaust gas. For example, certain exhaust gas aftertreatment systems for diesel-powered IC engines includes a SCR catalyst formulated to convert $NO_X$ (NO and $NO_2$ in some fraction) into harmless nitrogen gas ($N_2$) and water vapor ($H_2O$) in the presence of ammonia ($NH_3$).

Generally, a reductant such as a diesel exhaust fluid (e.g., an aqueous urea solution) is inserted into the aftertreatment system as a source of ammonia. The reductant facilitates the decomposition of the constituents of the exhaust gas by the SCR catalyst. During use, the reductant may be deposited on the SCR catalyst. Over time, the reductant deposits can build up and lead to reduction in a SCR catalytic conversion efficiency (CE) of the SCR catalyst. The SCR catalyst is generally heated to remove reductant deposits. However, if the temperature is not high enough or the heating duration is not long enough, the reductant deposits may not be fully removed by heating. The unremoved deposits will harden over time and can become extremely difficult to remove. Therefore, to remove reductant deposits and regenerate the SCR catalyst, the SCR catalysts are typically heated to a set temperature of greater than 500 degrees Celsius to evaporate the reductant deposits formed on the SCR catalyst and/or other locations of the aftertreatment system. However, exposure to such high temperatures on a regular basis can lead to aging of SCR catalyst and reduction in the SCR catalyst's operational life.

SUMMARY

Embodiments described herein relate generally to systems and methods for reactive regeneration of a SCR catalyst, and in particular, to systems and methods for regenerating SCR catalysts by initially using a lower temperature than that typically used for regenerating SCR catalysts, and using a higher temperatures when the lower temperature is not sufficient to remove reductant deposits from the SCR catalyst.

In some embodiments, a controller for controlling regeneration of a selective catalytic reduction (SCR) catalyst of an aftertreatment system, is configured to: cause increase in a SCR catalyst temperature of the SCR catalyst to a first regeneration temperature, the first regeneration temperature being lower than a high regeneration temperature that is equal to or greater than 500 degrees Celsius; determine an amount of ammonia slip downstream of the SCR catalyst; and cause increase in the SCR catalyst temperature to a second regeneration temperature greater than the first regeneration temperature but less than the high regeneration temperature based on the determined amount of ammonia slip.

In some embodiments, the controller is configured to: determine an amount of reductant deposits deposited on the SCR catalyst, wherein the controller is configured to cause the increase in the SCR catalyst temperature to the first regeneration temperature in response to the amount of reductant deposits being greater than a reductant deposit threshold.

In some embodiments, the controller is configured to determine the amount of reductant deposits based on a SCR catalytic conversion efficiency, an amount of reductant inserted into the aftertreatment system, and/or the amount of ammonia slip.

In some embodiments, the controller is configured to: determine an amount of reductant deposits deposited on the SCR catalyst; in response to the amount of reductant deposits deposited on the SCR catalyst being less than the reductant deposit threshold, determine if a time interval since a previous high temperature regeneration is greater than a time interval threshold, the high temperature being greater than 500 degrees Celsius, wherein the controller is configured to cause the increase in the SCR catalyst temperature to the first regeneration temperature in response to the amount of reductant deposits being less than a reductant deposit threshold and the time interval being equal to or greater than the time interval threshold.

In some embodiments, the controller is configured to: in response to the amount of ammonia slip after increasing the SCR catalyst temperature to the second regeneration temperature being greater than an ammonia slip threshold, maintain the SCR catalyst at the second regeneration temperature for a time period.

In some embodiments, the controller is configured to: in response to the amount of ammonia slip after increasing the SCR catalyst temperature to the second regeneration temperature being less than an ammonia slip threshold, cause an increase in the SCR catalyst temperature to the high regeneration temperature; and maintain the SCR catalyst at the high regeneration temperature for a time period.

In some embodiments, the controller is configured to: in response to the amount of ammonia slip after increasing the SCR catalyst temperature to the second regeneration temperature being less than an ammonia slip threshold, determine if a time interval since a previous high temperature regeneration is greater than a time interval threshold; in response to the time interval being less than the time interval threshold, wait until the time interval is equal to or greater than the time interval threshold; cause increase in the SCR catalyst temperature to the high regeneration temperature; and maintain the SCR catalyst at the high regeneration temperature for a time period.

In some embodiments, the controller is configured to determine whether ammonia slip is occurring by: determine a pre reactive regeneration SCR catalytic conversion efficiency of the SCR catalyst before increasing the temperature of the SCR catalyst to the first regeneration temperature; set an ammonia to $NO_X$ ratio to 1; determine a current SCR catalytic conversion efficiency of the SCR catalyst; and responsive to a difference between the current SCR catalytic conversion efficiency and the pre reactive regeneration SCR catalytic conversion efficiency being less than a threshold, set a slip flag indicating that ammonia slip is occurring.

In some embodiments, the controller is configured to: responsive to determining that the difference is greater than the threshold, increment a no-slip duration timer; determine a no-slip counter duration based on the no-slip duration timer; and responsive to the no-slip counter duration being greater than a threshold, remove the slip flag.

In some embodiments, an aftertreatment system comprises: a SCR catalyst; a reductant insertion assembly configured to insert a reductant into the SCR system; and a controller configured to: cause increase in a SCR catalyst temperature of the SCR catalyst to a first regeneration temperature, the first regeneration temperature being lower than a high regeneration temperature that is equal to or greater than 500 degrees Celsius; determine an amount of ammonia slip downstream of the SCR catalyst; and cause increase in the SCR catalyst temperature to a second regeneration temperature greater than the first regeneration temperature but less than the high regeneration temperature based on the determined amount of ammonia slip.

In some embodiments, a method for controlling regeneration of a selective catalytic reduction (SCR) catalyst of an aftertreatment system, comprises: causing, by a controller, an increase in a SCR catalyst temperature of the SCR catalyst to a first regeneration temperature, the first regeneration temperature being lower than a high regeneration temperature that is equal to or greater than 500 degrees Celsius; determining, by the controller, an amount of ammonia slip downstream of the SCR catalyst; and causing, by the controller, an increase in the SCR catalyst temperature to a second regeneration temperature greater than the first regeneration temperature but less than the high regeneration temperature based on the determined amount of ammonia slip.

In some embodiments, the method further comprises: determining, by the controller, an amount of reductant deposits deposited on the SCR catalyst, wherein the increase in the SCR catalyst temperature to the first regeneration temperature is caused, by the controller, in response to the amount of reductant deposits being greater than a reductant deposit threshold.

In some embodiments, the method further comprises: determining, by the controller, an amount of reductant deposits deposited on the SCR catalyst; in response to the amount of reductant deposits deposited on the SCR catalyst being less than the reductant deposit threshold, determining, by the controller, whether a time interval since a previous high temperature regeneration is greater than a time interval threshold, the high temperature being greater than 500 degrees Celsius, wherein the increase in the SCR catalyst temperature to the first regeneration temperature is caused, by the controller, in response to the amount of reductant deposits being less than a reductant deposit threshold and the time interval being equal to or greater than the time interval threshold.

In some embodiments, the method further comprises: in response to the amount of ammonia slip after increasing the SCR catalyst temperature to the second regeneration temperature being greater than an ammonia slip threshold, maintaining, by the controller, the SCR catalyst at the second regeneration temperature for a time period.

In some embodiments, the method further comprises: in response to the amount of ammonia slip after increasing the SCR catalyst temperature to the second regeneration temperature being less than an ammonia slip threshold, causing, by the controller, an increase in the SCR catalyst temperature to the high regeneration temperature; and maintaining, by the controller, the SCR catalyst at the high regeneration temperature for a time period.

In some embodiments, the method further comprises: in response to the amount of ammonia slip after increasing the SCR catalyst temperature to the second regeneration temperature being less than an ammonia slip threshold, determining, by the controller, if a time interval since a previous high temperature regeneration is greater than a time interval threshold; in response to the time interval being less than the time interval threshold, waiting, by the controller, until the time interval is equal to or greater than the time interval threshold; causing, by the controller, an increase in the SCR catalyst temperature to the high regeneration temperature; and maintaining, by the controller, the SCR catalyst at the high regeneration temperature for a time period.

In some embodiments, a method comprises: determining, by a controller, a pre reactive regeneration SCR catalytic conversion efficiency of a SCR catalyst before increasing the temperature of the SCR catalyst to the first regeneration temperature; setting, by the controller, an ammonia to $NO_X$ ratio to 1; determining, by the controller, a current SCR catalytic conversion efficiency of the SCR catalyst; and responsive to a difference between the current SCR catalytic conversion efficiency and the pre reactive regeneration SCR catalytic conversion efficiency being less than a threshold, setting, by the controller, a slip flag indicating that ammonia slip is occurring.

In some embodiments, the method further comprises: responsive to the difference being less than the threshold, decreasing, by the controller, the ammonia to $NO_X$ ratio by an offset.

In some embodiments, the method further comprises: responsive to determining that the difference is greater than the threshold, incrementing, by the controller, a no-slip duration timer.

In some embodiments, the method further comprises: determining, by the controller, a no-slip counter duration based on the no-slip duration timer; responsive to the no-slip counter duration being greater than a threshold, removing, by the controller, the slip flag, and setting, by the controller, the ammonia to $NO_X$ ratio to 1.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

FIGS. 3A and 3B are flow charts showing a method for reactive regeneration of a SCR catalyst included in an aftertreatment system, according to an embodiment.

Figure 1:
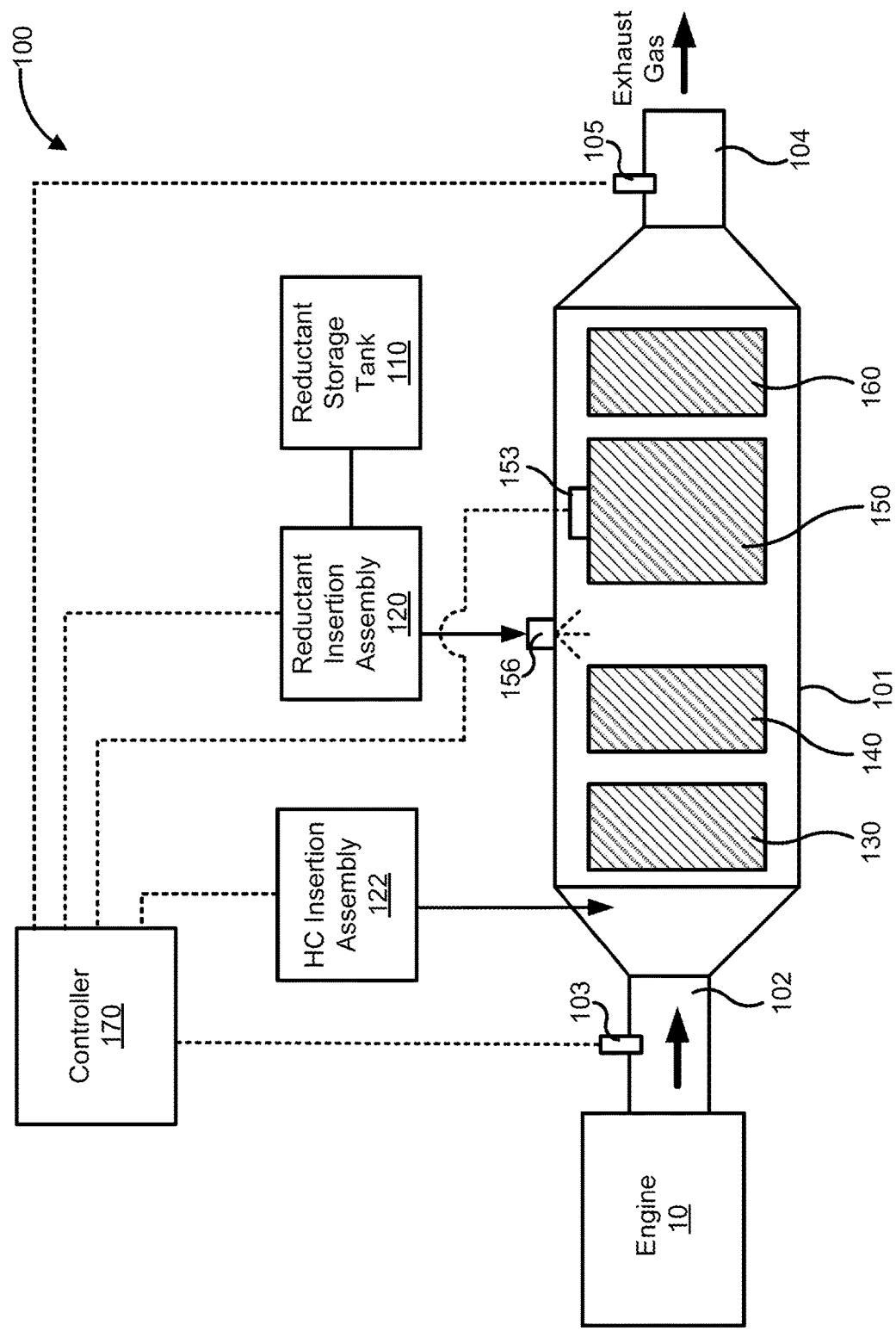
FIG. 1 is a schematic illustration of an aftertreatment system, according to an embodiment.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for reactive regeneration of a SCR catalyst, and in particular, to systems and methods for regenerating SCR catalysts by initially using a lower temperature than that typically used for regenerating SCR catalysts, and using a higher temperatures when the lower temperature is not sufficient to remove reductant deposits from the SCR catalyst.

Reductant deposits are a significant concern in operation of SCR catalysts. Reductant deposits can build up in the SCR catalyst or other components of the aftertreatment system and lead to reduction in a SCR catalytic conversion efficiency (CE) of the SCR catalyst. The SCR catalyst is generally heated to remove reductant deposits. However, if the temperature is not high enough or the heating duration is not long enough, the reductant deposits may not be fully removed by heating. The unremoved deposits will harden over time and can become extremely hard to remove. Therefore, to remove reductant deposits and regenerate the SCR catalyst, the SCR catalysts are typically heated to a set temperature of greater than 500 degrees Celsius to evaporate the reductant deposits formed on the SCR catalyst and/or other locations of the aftertreatment system. However, exposure to such high temperatures on a regular basis can also lead to aging of the SCR catalyst and reduction in the SCR catalyst's operational life.

In contrast, various embodiments of the systems and methods described herein for reactive regeneration of a SCR catalyst may provide one or more benefits including, for example: (1) regenerating SCR catalysts at lower temperatures and for shorter time durations, thereby preventing frequent exposure of the SCR catalyst to high regeneration temperatures; (2) adjusting regeneration time and duration based on SCR catalytic CE, enabling the SCR catalyst to operate at an optimal CE; and (3) increasing SCR catalyst life and reducing maintenance costs.

FIG. 1 is a schematic illustration of an aftertreatment system 100, according to an embodiment. The aftertreatment system 100 is configured to receive exhaust gas (e.g., diesel exhaust gas) from an engine 10 and treat constituents (e.g., $NO_X$, CO, $CO_2$) of the exhaust gas. The aftertreatment system 100 includes a reductant storage tank 110, a reductant insertion assembly 120, a SCR catalyst 150, and a controller 170, and may optionally also include an oxidation catalyst 130, a filter 140, an ammonia oxidation ($AMO_X$) catalyst 160, and a hydrocarbon insertion assembly 122.

The engine 10 may include, for example, a diesel engine, a gasoline engine, a natural gas engine, a dual fuel engine, a biodiesel engine, an E-85 engine, or any other suitable engine. In some embodiments, the engine 10 includes a diesel engine. The engine 10 combusts fuel and generates an exhaust gas that includes $NO_X$, CO, $CO_2$, and other constituents.

The aftertreatment system 100 includes a housing 101 within which components of the aftertreatment system 100 are disposed. The housing 101 may be formed from a rigid, heat-resistant and corrosion-resistant material, for example stainless steel, iron, aluminum, metals, ceramics, or any other suitable material. The housing 101 may have any suitable cross-section, for example, circular, square, rectangular, oval, elliptical, polygonal, or any other suitable shape.

An inlet conduit 102 is fluidly coupled to an inlet of the housing 101 and structured to receive exhaust gas from the engine 10 and communicate the exhaust gas to an internal volume defined by the housing 101. Furthermore, an outlet conduit 104 may be coupled to an outlet of the housing 101 and structured to expel treated exhaust gas into the environment (e.g., treated to remove particulate matter such as soot by the filter 140 and/or reduce constituents of the exhaust gas such as $NO_X$ gases, CO, unburnt hydrocarbons, etc. included in the exhaust gas by the SCR catalyst 150 and the oxidation catalyst 130).

A first sensor 103 may be positioned in the inlet conduit 102. The first sensor 103 may comprise a $NO_X$ sensor configured to measure an amount of $NO_X$ gases included in the exhaust gas flowing into the SCR catalyst 150, and may include a physical sensor or a virtual sensor. In various embodiments, a temperature sensor, a pressure sensor, an oxygen sensor or any other sensor may also be positioned in the inlet conduit 102 so as to determine one or more operational parameters of the exhaust gas flowing through the aftertreatment system 100.

A second sensor 105 may be positioned in the outlet conduit 104. The second sensor 105 may comprise a second $NO_X$ sensor configured to determine an amount of $NO_X$ gases expelled into the environment after passing through the SCR catalyst 150. In other embodiments, the second sensor 105 may comprise a particulate matter sensor configured to determine an amount of particulate matter (e.g., soot included in the exhaust gas exiting the filter 140) in the exhaust gas being expelled into the environment. In still other embodiments, the second sensor 105 may comprise an ammonia sensor configured to measure an amount of ammonia in the exhaust gas flowing out of the SCR catalyst 150, i.e., determine the ammonia slip. This may be used as a measure of a catalytic conversion efficiency of the SCR catalyst 150 for adjusting an amount of reductant to be inserted into the SCR catalyst 150, and/or adjusting a temperature of the SCR catalyst 150 so as to allow the SCR catalyst 150 to effectively use the ammonia for catalytic decomposition of the $NO_X$ gases included in the exhaust gas flowing therethrough. The $AMO_X$ catalyst 160 may be positioned downstream of the SCR catalyst 150 so as to decompose any unreacted ammonia in the exhaust gas downstream of the SCR catalyst 150.

The oxidation catalyst 130 may be positioned upstream of the SCR catalyst 150 and configured to decompose unburnt hydrocarbons and/or CO included in the exhaust gas. In some embodiments, the oxidation catalyst 130 may include a diesel oxidation catalyst. The filter 140 is disposed downstream of the oxidation catalyst 130 and upstream of the SCR catalyst 150 and configured to remove particulate matter (e.g., soot, debris, inorganic particles, etc.) from the exhaust gas. In various embodiments, the filter 140 may include a ceramic filter. In some embodiments, the filter 140 may include a cordierite filter which can, for example, be an asymmetric filter. In yet other embodiments, the filter 140 may be catalyzed.

The SCR catalyst 150 is formulated to decompose constituents of an exhaust gas flowing therethrough in the presence of a reductant, as described herein. In some embodiments, the SCR catalyst 150 may include a selective catalytic reduction filter (SCRF). Any suitable SCR catalyst 150 may be used such as, for example, platinum, palladium, rhodium, cerium, iron, manganese, copper, vanadium based catalyst, any other suitable catalyst, or a combination thereof. The SCR catalyst 150 may be disposed on a suitable substrate such as, for example, a ceramic (e.g., cordierite) or metallic (e.g., kanthal) monolith core which can, for example, define a honeycomb structure. A washcoat can also be used as a carrier material for the SCR catalyst 150. Such washcoat materials may comprise, for example, aluminum oxide, titanium dioxide, silicon dioxide, any other suitable washcoat material, or a combination thereof.

Although FIG. 1, shows only the oxidation catalyst 130, the filter 140, the SCR catalyst 150, and the $AMO_X$ catalyst 160 disposed within the internal volume defined by the housing 101, in other embodiments, a plurality of aftertreatment components may be disposed within the internal volume defined by the housing 101 in addition to the oxidation catalyst 130, the filter 140, the SCR catalyst 150 and the $AMO_X$ catalyst 160. Such aftertreatment components may comprise, for example, mixers, baffle plates, secondary filters (e.g., a secondary partial flow or catalyzed filter) or any other suitable aftertreatment component.

In some embodiments, the aftertreatment system 100 may also include the hydrocarbon insertion assembly 122. The hydrocarbon insertion assembly 122 is configured to insert hydrocarbons (e.g., diesel) into the exhaust gas. The oxidation catalyst 130 catalyzes the combustion of the hydrocarbons which increases the temperature of the exhaust gas. Heating the exhaust gas may be used to regenerate the filter 140 by burning off particulate matter that may have accumulated on the filter 140, and/or regenerate the SCR catalyst 150 by evaporating reductant deposits deposited on the SCR catalyst 150. In some embodiments, a heater 153 may be coupled to the SCR catalyst 150 and configured to heat the SCR catalyst 150 to a regeneration temperature (e.g., based on a command from the controller 170).

A reductant port 156 may be positioned on a sidewall of the housing 101 and structured to allow insertion of a reductant therethrough into the internal volume defined by the housing 101. The reductant port 156 may be positioned upstream of the SCR catalyst 150 (e.g., to allow reductant to be inserted into the exhaust gas upstream of the SCR catalyst 150) or over the SCR catalyst 150 (e.g., to allow reductant to be inserted directly on the SCR catalyst 150). In other embodiments, the reductant port 156 may be disposed on the inlet conduit 102 and configured to insert the reductant into the inlet conduit 102 upstream of the SCR catalyst 150. In such embodiments, mixers, baffles, vanes or other structures may be positioned in the inlet conduit 102 so as to facilitate mixing of the reductant with the exhaust gas.

The reductant storage tank 110 is structured to store a reductant. The reductant is formulated to facilitate decomposition of the constituents of the exhaust gas (e.g., $NO_X$ gases included in the exhaust gas). Any suitable reductant may be used. In some embodiments, the exhaust gas comprises a diesel exhaust gas and the reductant comprises a diesel exhaust fluid. For example, the diesel exhaust fluid may comprise urea, an aqueous solution of urea, or any other fluid that comprises ammonia, by-products, or any other diesel exhaust fluid as is known in the arts (e.g., the diesel exhaust fluid marketed under the name ADBLUE®). For example, the reductant may comprise an aqueous urea solution having a particular ratio of urea to water. In some embodiments, the reductant can comprise an aqueous urea solution including 32.5% by volume of urea and 67.5% by volume of deionized water, including 40% by volume of urea and 60% by volume of deionized water, or any other suitable ratio of urea to deionized water.

A reductant insertion assembly 120 is fluidly coupled to the reductant storage tank 110. The reductant insertion assembly 120 is configured to selectively insert the reductant into the SCR catalyst 150 or upstream thereof (e.g., into the inlet conduit 102) or a mixer (not shown) positioned upstream of the SCR catalyst 150. The reductant insertion assembly 120 may comprise various structures to facilitate receipt of the reductant from the reductant storage tank 110 and delivery to the SCR catalyst 150, for example, pumps, valves, screens, filters, etc.

The aftertreatment system 100 may also comprise a reductant injector fluidly coupled to the reductant insertion assembly 120 and configured to insert the reductant (e.g., a combined flow of reductant and compressed air) into the SCR catalyst 150. In various embodiments, the reductant injector may comprise a nozzle having predetermined diameter. In various embodiments, the reductant injector may be positioned in the reductant port 156 and structured to deliver a stream or a jet of the reductant into the internal volume of the housing 101 so as to deliver the reductant to the SCR catalyst 150.

The controller 170 is operatively coupled to the reductant insertion assembly 120, the first sensor 103, the second sensor 105, and in some embodiments, the hydrocarbon insertion assembly 122 and/or the heater 153. For example, the controller 170 may be communicatively coupled to the first sensor 103 and may be configured to receive a first sensor signal from the first sensor 103, for example, to determine an amount of $NO_X$ gases included in the exhaust gas entering the aftertreatment system 100. The controller 170 may also be communicatively coupled to the second sensor 105 and may be configured to determine a concentration of $NO_X$ gases or ammonia included in the exhaust gas being expelled into the environment.

The controller 170 may be configured to determine the SCR catalytic CE of the SCR catalyst 150 based on the inlet $NO_X$ amount of $NO_X$ gases entering the aftertreatment system 100, and the outlet $NO_X$ amount of $NO_X$ gases exiting the aftertreatment system 100. For example, the controller 170 may determine a difference between the inlet $NO_X$ amount and the outlet $NO_X$ amount and determine the SCR catalytic CE based on the difference.

The controller 170 may also be configured to determine an amount of ammonia slip, i.e., an amount of ammonia gas in the exhaust gas downstream of the SCR catalyst 150 based on the second sensor signal (e.g., an outlet $NO_X$ signal) received from the second sensor 105. For example, the controller 170 may be configured to correlate the outlet $NO_X$ amount measured by the outlet $NO_X$ sensor, and determine the amount of ammonia slip therefrom. The controller 170 may be configured to command the reductant insertion assembly 120 to adjust an amount of the reductant inserted into the aftertreatment system 100 based on the inlet $NO_X$ amount, the SCR catalytic CE, an exhaust gas temperature at an inlet of the SCR catalyst 150 (e.g., determined by temperature sensors that may located at various positions in the aftertreatment system 100), an exhaust gas flow rate and/or any other exhaust gas parameter.

The controller 170 may be operably coupled to the engine 10, the first sensor 103, the second sensor 105, the reductant insertion assembly 120, the hydrocarbon insertion assembly 122, the heater 153, and various components of the aftertreatment system 100 using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections.

In some embodiments, the controller 170 is configured to determine an amount of reductant deposits on the SCR catalyst 150. For example, the controller 170 may be configured to determine the amount of reductant deposits based on the SCR catalytic CE, and amount of reductant inserted into the aftertreatment system 100 and/or an amount of ammonia slip. The controller 170 may include equations, algorithms or lookup tables to determine the amount of reductant deposits based on the one or more parameters described herein.

The controller 170 is configured to cause an increase in a SCR catalyst temperature of the SCR catalyst 150 to a first regeneration temperature. The first regeneration temperature may be in a range of about 300 degrees Celsius to about 400 degrees Celsius (e.g., 300, 310, 320, 330, 340, 350, 360, 370, 380, 390, or 400 degrees Celsius, inclusive), and is significantly lower than a high regeneration temperature, for example, equal to or greater than about 500 degrees Celsius (e.g., 500, 510, 520, 530, 540, 550, 560, 570, 580, 590, or 600 degrees Celsius, inclusive) at which SCR catalysts are typically regenerated. In particular embodiments, the first regeneration temperature is about 350 degrees Celsius.

The controller 170 may be configured to cause the increase in the SCR catalyst temperature to the first regeneration temperature in response to the amount of reductant deposits being greater than a reductant deposit threshold. For example, a drop in the SCR catalytic CE to below 70% may indicate that a high ammonia slip is occurring indicating decomposition of reductant deposits in the SCR catalyst 150, and/or an amount of reductant deposits is greater than the reductant deposit threshold. In some embodiments, the controller 170 may be configured to heat the SCR catalyst 150 to the first regeneration temperature or any other regeneration temperature by inserting hydrocarbons into the aftertreatment system 100, as previously described herein. In some embodiments, the controller 170 may be configured to selectively activate the heater 153 to heat the SCR catalyst 150 to the first regeneration temperature.

In some embodiments, in response to determining that the amount of reductant deposits deposited on the SCR catalyst 150 is less than the reductant deposit threshold, the controller 170 may determine if a time interval since a previous high temperature regeneration (e.g., regeneration at a temperature of equal to or greater than 500 degree Celsius) is greater than a time interval threshold. The time interval threshold may be in a range of about 12 hours to about 24 hours. The controller 170 may be configured to cause the increase in the SCR catalyst temperature to the first regeneration temperature in response to the time interval being equal to or greater than the time interval threshold. For example, the controller 170 may wait till the time interval is equal to or greater than the time interval threshold before regeneration of the SCR catalyst 150 at the first regeneration temperature. In this manner, the controller 170 may prevent frequent regeneration events, which reduces aging of the SCR catalyst 150 and increases its useful life.

The controller 170 is also configured to determine the amount of ammonia slip downstream of the SCR catalyst 150, as previously described herein. If the ammonia slip is greater than the ammonia slip threshold, the controller 170 is configured to maintain the SCR catalyst 150 at the first regeneration temperature for a first time period, for example, in a range of about 5 minutes to about 15 minutes (e.g., 5, 7, 9, 11, 13, or 15 minutes, inclusive, or in any range between these time periods). The amount of ammonia slip being greater than the ammonia slip threshold indicates that the first regeneration temperature is sufficient to decompose or evaporate reductant deposits on the SCR catalyst 150, so that a higher temperature regeneration does not have to be performed.

In response to the amount of ammonia slip being less than the ammonia slip threshold, the controller 170 is configured to increase the SCR catalyst temperature to a second regeneration temperature greater than the first regeneration temperature. The second regeneration temperature is however, still lower than the high regeneration temperature, for example, is in a range of about 401 degrees Celsius to about 499 degrees Celsius (e.g., about 401, 410, 420, 430, 440, 450, 460, 470, 480, 490, or 499 degrees Celsius, inclusive of all ranges and values therebetween). In particular embodiments, the second regeneration temperature is about 450 degrees Celsius.

The controller 170 determines the amount of ammonia slip downstream of the SCR catalyst 150 after increasing the SCR catalyst temperature to the second regeneration temperature. In response to the amount of ammonia slip after increasing the SCR catalyst temperature to the second regeneration temperature being greater than the ammonia slip threshold, the controller 170 is configured to maintain the SCR catalyst temperature at the second regeneration temperature for a second time period. The second time period may be equal to the first time period, that is, in a range of about 5 minutes to about 15 minutes (e.g., 5, 7, 9, 11, 13, or 15 minutes, inclusive, or in any range between these time periods), or may be a longer time period, for example, about 15 minutes to about 30 minutes (e.g., 15, 17, 19, 21, 23, 25, 27, 29, or 30 minutes, inclusive, or in any range between these time periods). The ammonia slip being greater than the ammonia slip threshold indicates that the second regeneration temperature is sufficient to decompose or evaporate reductant deposits deposited on the SCR catalyst 150.

In some embodiments, in response to the amount of ammonia slip after increasing the SCR catalyst temperature to the second regeneration temperature being less than the ammonia slip threshold, the controller 170 is configured to increase the SCR catalyst temperature to the high regeneration temperature that is equal to or greater than 500 degrees Celsius. In some embodiments, the high regeneration temperature may be about 550 degrees Celsius.

The controller 170 maintains the SCR catalyst 150 at the high regeneration temperature for a third time period. In some embodiments, the third time period may be in a range of about 15 minutes to about 30 minutes (e.g., 15, 17, 19, 21, 23, 25, 27, 29, or 30 minutes, inclusive, or in any range between these time periods), and sufficient to remove most of the reductant deposits from the SCR catalyst 150. In certain embodiments, the controller 170 only performs this high regeneration temperature regeneration of the SCR catalyst 150 when regeneration at low temperatures is not successful. Thus, the frequency of high temperature regenerations is reduced which reduces aging of the SCR catalyst 150 and increases its life.

In some embodiments, before causing increase in the SCR catalyst temperature to the high regeneration temperature, the controller 170 is configured to determine if a time interval since a previous high temperature regeneration (e.g., regeneration at a temperature greater than 500 degrees Celsius) is greater than a time interval threshold (e.g., in a range of 12 hours to 24 hours). In response to the time interval being less than the time interval threshold, the controller 170 is configured to wait until the time interval is equal to or greater than the time interval threshold before causing increase in the SCR catalyst temperature to the high regeneration temperature.

Figure 2:
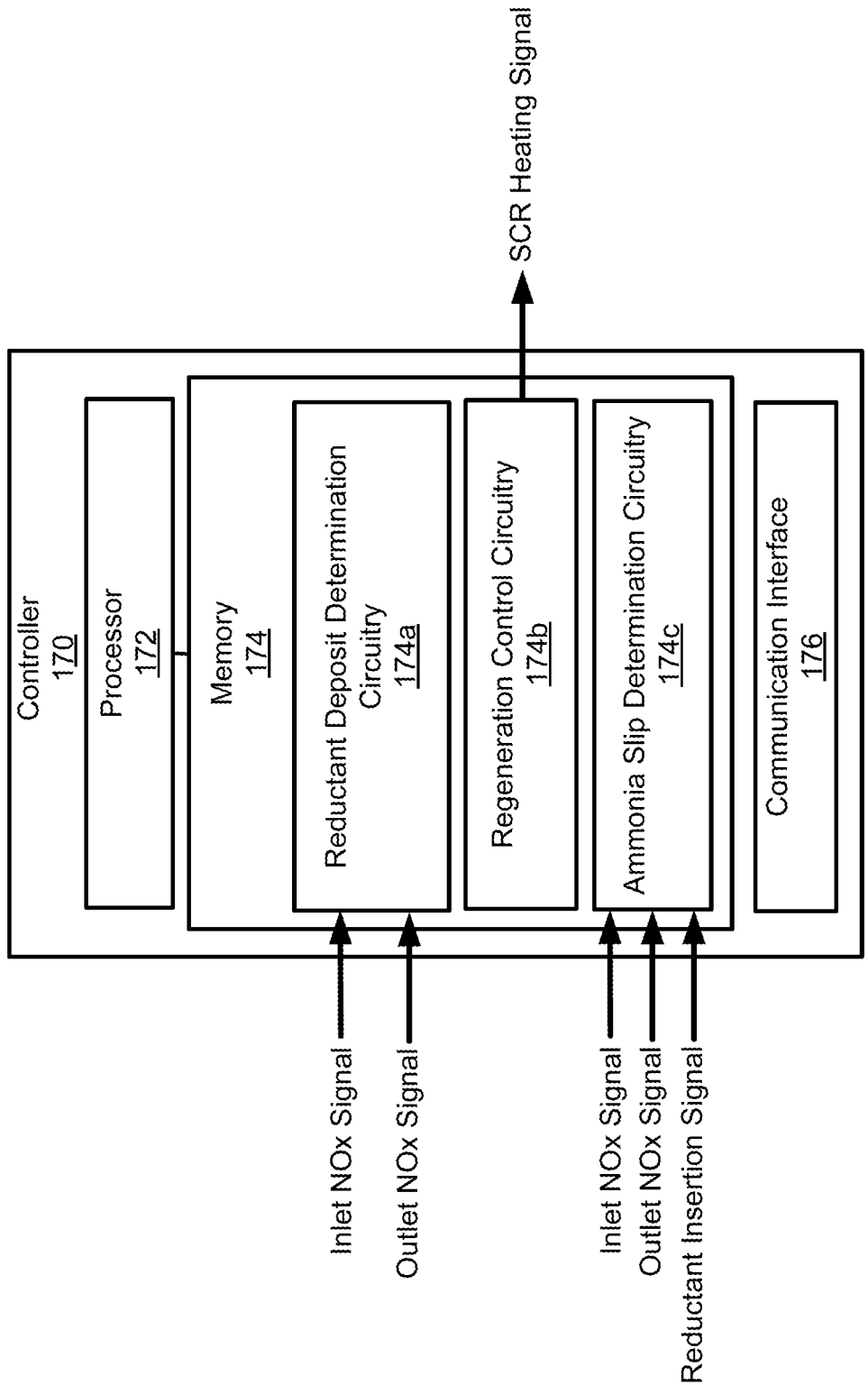
FIG. 2 is a block diagram of a controller that may be included in the aftertreatment system of FIG. 1, according to an embodiment.

In some embodiments, the controller 170 includes various circuitries or modules configured to perform the operations of the controller 170 described herein. For example, FIG. 2 shows a block diagram of the controller 170, according to an embodiment. The controller 170 may include a processor 172, a memory 174, or any other computer readable medium, and a communication interface 176. Furthermore, the controller 170 includes a reductant deposit determination circuitry 174a, a regeneration control circuitry 174b, and an ammonia slip determination circuitry 174c. It should be understood that FIG. 2 shows only one embodiment of the controller 170 and any other controller capable of performing the operations described herein can be used.

The processor 172 can comprise a microprocessor, programmable logic controller (PLC) chip, an ASIC chip, or any other suitable processor. The processor 172 is in communication with the memory 174 and configured to execute instructions, algorithms, commands, or otherwise programs stored in the memory 174.

The memory 174 comprises any of the memory and/or storage components discussed herein. For example, memory 174 may comprise a RAM and/or cache of processor 172. The memory 174 may also comprise one or more storage devices (e.g., hard drives, flash drives, computer readable media, etc.) either local or remote to controller 170. The memory 174 is configured to store look up tables, algorithms, or instructions.

In one configuration, the reductant deposit determination circuitry 174a, the regeneration control circuitry 174b, and the ammonia slip determination circuitry 174c are embodied as machine or computer-readable media (e.g., stored in the memory 174) that is executable by a processor, such as the processor 172. As described herein and amongst other uses, the machine-readable media (e.g., the memory 174) facilitates performance of certain operations of the reductant deposit determination circuitry 174a, the regeneration control circuitry 174b, and the ammonia slip determination circuitry 174c to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the reductant deposit determination circuitry 174a, the regeneration control circuitry 174b, and the ammonia slip determination circuitry 174c are embodied as hardware units, such as electronic control units. As such, the reductant deposit determination circuitry 174a, the regeneration control circuitry 174b, and the ammonia slip determination circuitry 174c may be embodied as one or more circuitry components including, but not limited to, processing circuitry, network interfaces, peripheral devices, input devices, output devices, sensors, etc.

In some embodiments, the reductant deposit determination circuitry 174a, the regeneration control circuitry 174b, and the ammonia slip determination circuitry 174c may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the reductant deposit determination circuitry 174a, the regeneration control circuitry 174b, and the ammonia slip determination circuitry 174c may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

Thus, the reductant deposit determination circuitry 174a, the regeneration control circuitry 174b, and the ammonia slip determination circuitry 174c may also include programmable hardware devices such as field programmable gate arrays, programmable array logic, programmable logic devices or the like. In this regard, the reductant deposit determination circuitry 174a, the regeneration control circuitry 174b, and the ammonia slip determination circuitry 174c may include one or more memory devices for storing instructions that are executable by the processor(s) of the reductant deposit determination circuitry 174a, the regeneration control circuitry 174b, and the ammonia slip determination circuitry 174c. The one or more memory devices and processor(s) may have the same definition as provided below with respect to the memory 174 and the processor 172.

In the example shown, the controller 170 includes the processor 172 and the memory 174. The processor 172 and the memory 174 may be structured or configured to execute or implement the instructions, commands, and/or control processes described herein with respect to the reductant deposit determination circuitry 174a, the regeneration control circuitry 174b, and the ammonia slip determination circuitry 174c. Thus, the depicted configuration represents the aforementioned arrangement in which the reductant deposit determination circuitry 174a, the regeneration control circuitry 174b, and the ammonia slip determination circuitry 174c are embodied as machine or computer-readable media. However, as mentioned above, this illustration is not meant to be limiting as the present disclosure contemplates other embodiments such as the aforementioned embodiment where the reductant deposit determination circuitry 174a, the regeneration control circuitry 174b, and the ammonia slip determination circuitry 174c, or at least one circuit of the reductant deposit determination circuitry 174a, the regeneration control circuitry 174b, and the ammonia slip determination circuitry 174c are configured as a hardware unit. All such combinations and variations are intended to fall within the scope of the present disclosure.

The processor 172 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the reductant deposit determination circuitry 174a, the regeneration control circuitry 174b, and the ammonia slip determination circuitry 174c may comprise or otherwise share the same processor, which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 174 (e.g., RAM, ROM, Flash Memory, hard disk storage, etc.) may store data and/or computer code for facilitating the various processes described herein. The memory 174 may be communicably connected to the processor 172 to provide computer code or instructions to the processor 172 for executing at least some of the processes described herein. Moreover, the memory 174 may be or include tangible, non-transient volatile memory or non-volatile memory. Accordingly, the memory 174 may include database components, object code components, script components, or any other type of information structure for supporting the various activities and information structures described herein.

The communication interface 176 may include wireless interfaces (e.g., jacks, antennas, transmitters, receivers, communication interfaces, wire terminals, etc.) for conducting data communications with various systems, devices, or networks. For example, the communication interface 176 may include an Ethernet card and port for sending and receiving data via an Ethernet-based communications network and/or a Wi-Fi communication interface for communicating with the first sensor 103, the second sensor 105, the reductant insertion assembly 120, and the hydrocarbon insertion assembly 122. The communication interface 176 may be structured to communicate via local area networks or wide area networks (e.g., the Internet, etc.) and may use a variety of communications protocols (e.g., IP, LON, Bluetooth, ZigBee, radio, cellular, near field communication, etc.).

The reductant deposit determination circuitry 174a is configured to determine the amount of reductant deposited on the SCR catalyst 150. For example, the reductant deposit determination circuitry 174a may receive an inlet $NO_X$ signal from the first sensor 103 that corresponds to an inlet $NO_X$ amount, receive an outlet $NO_X$ signal from the second sensor 105 that corresponds to the outlet $NO_X$ amount, a reductant insertion signal indicative of an amount of reductant inserted into the aftertreatment system 100, and determines the amount of reductant deposited on the SCR catalyst 150, as previously described herein.

The regeneration control circuitry 174b is configured to control regeneration of the SCR catalyst 150. For example, the regeneration control circuitry 174b is configured to selectively cause heating of the SCR catalyst 150 to the first regeneration temperature, the second regeneration temperature, or the high regeneration temperature based on the amount of ammonia slip. For example, the regeneration control circuitry 174b is configured to generate a SCR heating signal configured to activate the hydrocarbon insertion assembly 122 or the heater 153 to cause heating of the SCR catalyst 150 to the first regeneration temperature for the first time period, the second regeneration temperature for the second time period, or the high regeneration temperature for the third time period.

The ammonia slip determination circuitry 174c is configured to determine the amount of ammonia slip downstream of the SCR catalyst 150. For example, the ammonia slip determination circuitry 174c may receive an outlet $NO_X$ signal from the second sensor 105, and determine the ammonia slip therefrom.

FIGS. 3A and 3B are flow charts showing an example method 200 for controlling regeneration of a SCR catalyst included in an aftertreatment system, according to an embodiment. While described with reference to the controller 170 and the SCR catalyst 150 of the aftertreatment system 100, the operations of the method 200 can be used with any controller included in any aftertreatment system.

The method 200 may include determining, by the controller 170, an amount of reductant deposits deposited on the SCR catalyst 150 included in the aftertreatment system 100, at 202. At 204, the controller 170 determines if the amount of reductant deposited on the SCR catalyst 150 is greater than a reductant deposit threshold, as previously described herein. In response to the amount of reductant deposited being greater than the reductant deposit threshold (204: YES), the method 200 moves to operation 208 and the controller 170 initiates reactive regeneration of the SCR catalyst 150, at 208.

In response to the amount of reductant deposits being less than the reductant deposit threshold (204:NO), the controller 170 determines if a time interval since a previous high temperature regeneration is equal to or greater than a time interval threshold (e.g., in a range of 12 hours to 24 hours), at 206. In response to the time interval being less than the time interval threshold (206:NO), the method 200 returns to operation 202. On the other hand, in response to the time interval being greater than the time interval threshold, the method 200 moves to operation 208.

At 210, the controller 170 causes an increase in a SCR catalyst temperature of the SCR catalyst 150 to the first regeneration temperature (e.g., in a range of 300 degrees Celsius to 400 degrees Celsius). At 212, the controller 170 determines if the ammonia slip is greater than an ammonia slip threshold. In response to the ammonia slip being greater than the ammonia slip threshold (212:YES), the controller 170 determines that the first regeneration temperature is sufficient to regenerate the SCR catalyst 150, and maintains the SCR catalyst 150 at the first regeneration temperature for a first time period (e.g., in a range of about 5 minutes to about 15 minutes), at 214. The method 200 then returns to operation 202.

In response to determining that the ammonia slip is less than the ammonia slip threshold (212:NO), the controller 170 causes increase in the SCR catalyst temperature to the second regeneration temperature (e.g., in a range of about 401 degrees Celsius to about 499 degrees Celsius) greater than the first regeneration temperature. At 218, the controller 170 determines whether the amount of ammonia slip is greater than the ammonia slip threshold. In response to the amount of ammonia slip being greater than the ammonia slip threshold (218:YES), the controller 170 maintains the SCR catalyst 150 at the second regeneration temperature for a second time period (e.g., in a range of about 5 minutes to about 15 minutes, or about 15 minutes to about 30 minutes). The method 200 then returns to operation 202.

However, if the ammonia slip is less than the ammonia slip threshold (218:NO), the controller 170 determines if a time interval since a previous high temperature regeneration event is equal to or greater than a time interval threshold (e.g., 12 hours to 24 hours), at 222. In response to the time interval being equal to or greater than the time interval threshold (222:YES), the method 200 proceeds to operation 226, and the controller 170 causes an increase in the SCR catalyst temperature to the high regeneration temperature (e.g., in a range of about 500 degrees Celsius to about 600 degrees Celsius). At 228, the controller 170 maintains the SCR catalyst temperature at the high regeneration temperature for a third time period (e.g., in a range of about 15 minutes to about 30 minutes). If at operation 222, the controller 170 determines that the time interval is less than the time interval threshold (222:NO) the controller 170 waits until the time interval is equal to or greater than the time interval threshold, at 224, before proceeding to operation 226.

Figure 4:
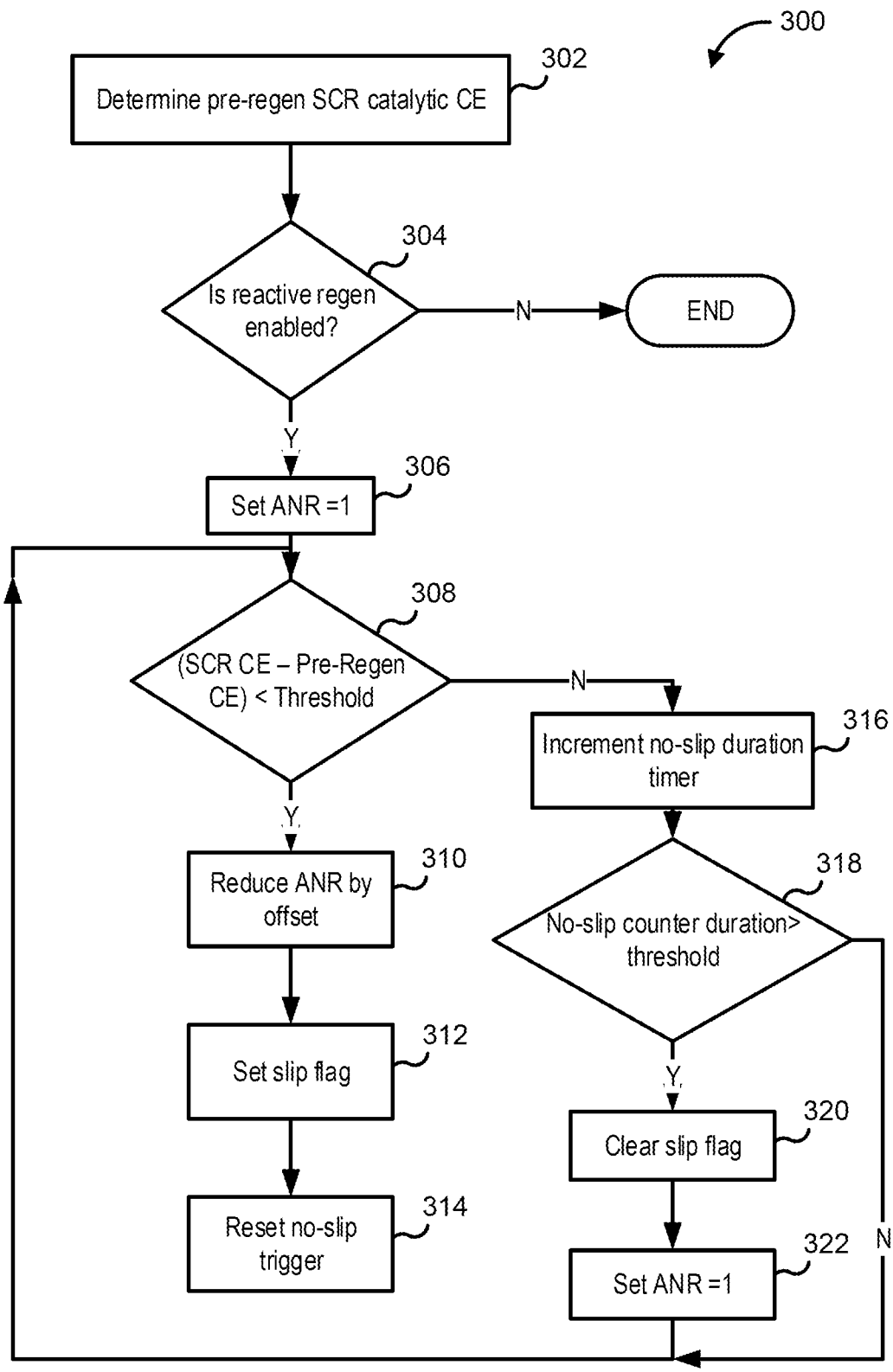
FIG. 4 is a flow chart showing a method for determining an ammonia slip which may be used to set a target regeneration temperature for a SCR catalyst, according to an embodiment.

FIG. 4 is a flow chart showing a method 300 for determining an ammonia slip downstream of a SCR catalyst which may be used to set a target regeneration temperature, according to an embodiment. While the operations of the method 300 are described with respect to the controller 170 and the SCR catalyst 150 of the aftertreatment system 100, it should be understood that the operations of the method 300 can be implemented in any controller for use with any aftertreatment system.

The method 300 includes determining by the controller 170 a pre reactive regeneration SCR catalytic CE of the SCR catalyst 150, at 302. For example, the controller 170 determines the SCR catalytic CE before initiating reactive regeneration based on an inlet $NO_X$ amount and an outlet $NO_X$ amount, as previously described herein.

At 304, the controller determines if reactive regeneration is enabled. If reactive regeneration is not enabled (304:NO), the method 300 ends. In response to the reactive regeneration being enabled (304:YES), the controller 170 sets an ammonia to $NO_X$ ratio (ANR) to 1, at 306. At 308, the controller 170 determines whether a difference between a current SCR catalytic CE and the pre reactive regeneration SCR catalytic CE is less than a threshold. In response to the difference being less than the threshold (308:YES), the controller 170 reduces the ANR by an offset, for example, based on the difference between the current SCR catalytic CE and the pre reactive regeneration SCR catalytic CE, at 310. At 312, the controller 170 sets a slip flag which indicates that ammonia slip is occurring. At 314, the controller 170 may reset a no-slip trigger which may have been previously triggered in response to a regeneration even where ammonia slip did not occur.

If at 308, the controller 170 determines that the difference between the current SCR catalytic CE and the pre-reactive regeneration SCR catalytic CE is greater than the threshold (308:NO), the controller 170 increments a no-slip duration timer, at 316. The no-slip duration timer may be a running counter which continuously increments from a time a previous no-slip (i.e., no ammonia slip) condition occurred during a regeneration event.

At 318, the controller 170 determines if a no-slip counter duration is greater than a threshold. If the no-slip counter duration is less than the threshold (318:NO), then the method returns to operation 308. The no-slip counter duration corresponds to a time interval since a last no ammonia slip regeneration event. In response to the no-slip counter duration being greater than the threshold (318:YES), the controller 170 clears a slip flag that may have been previous set in the controller 170, at 320. At 322, the controller 170 sets the ANR to 1, and the method then returns to operation 308.

Figure 5A:
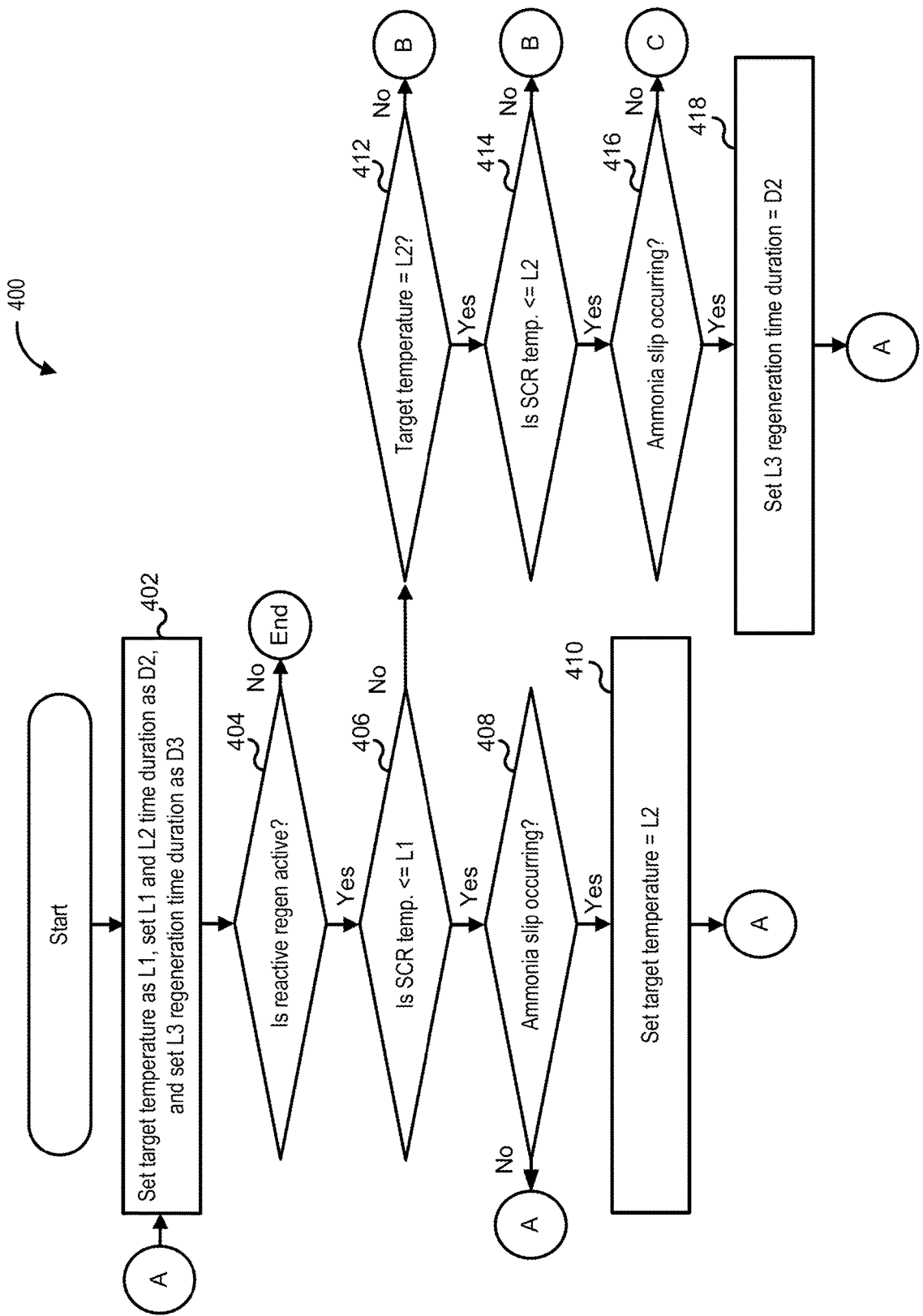
FIGS. 5A through 5C are flow charts showing a method for reactive regeneration of a SCR catalyst included in an aftertreatment system, according to another embodiment.
Figure 5B:
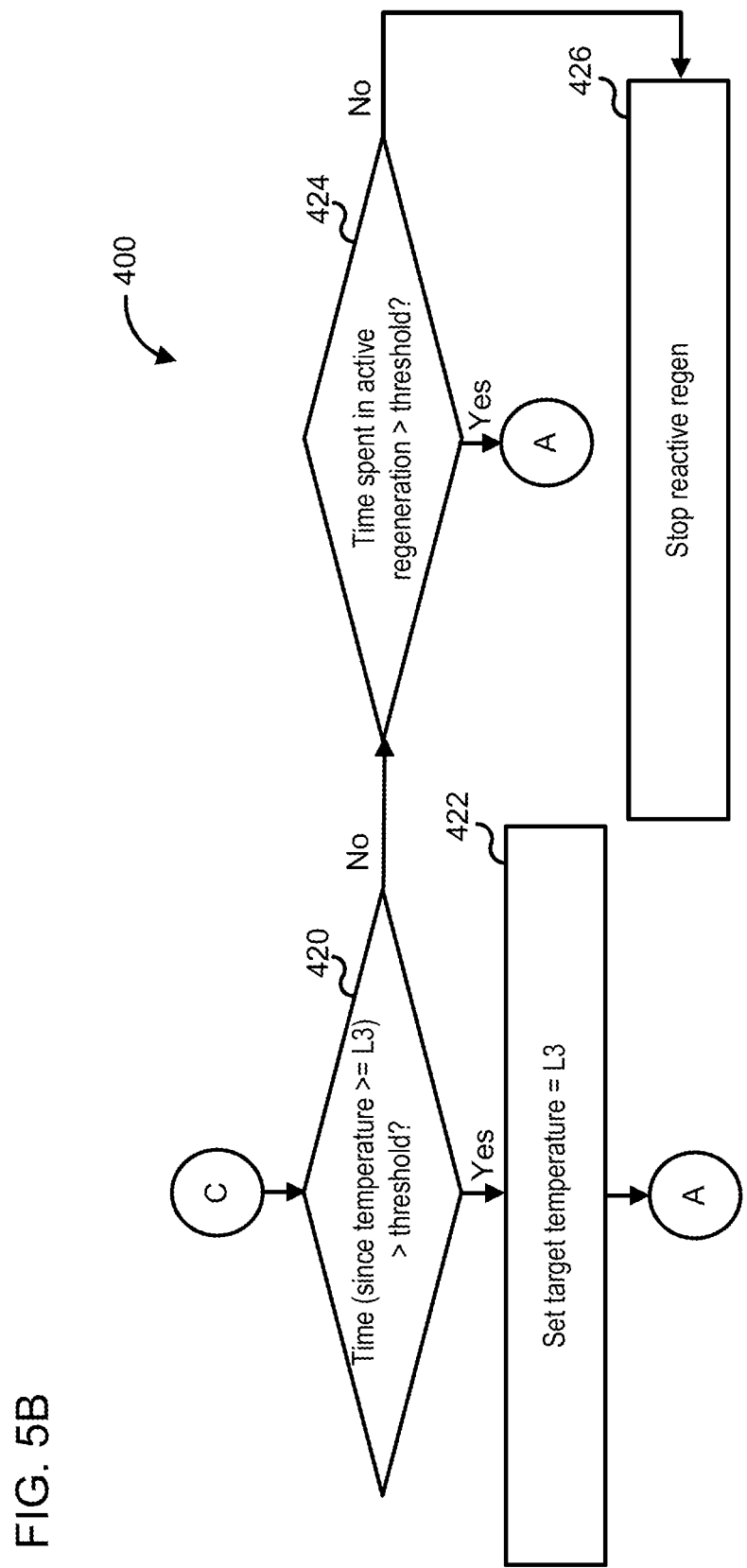
Figure 5C:
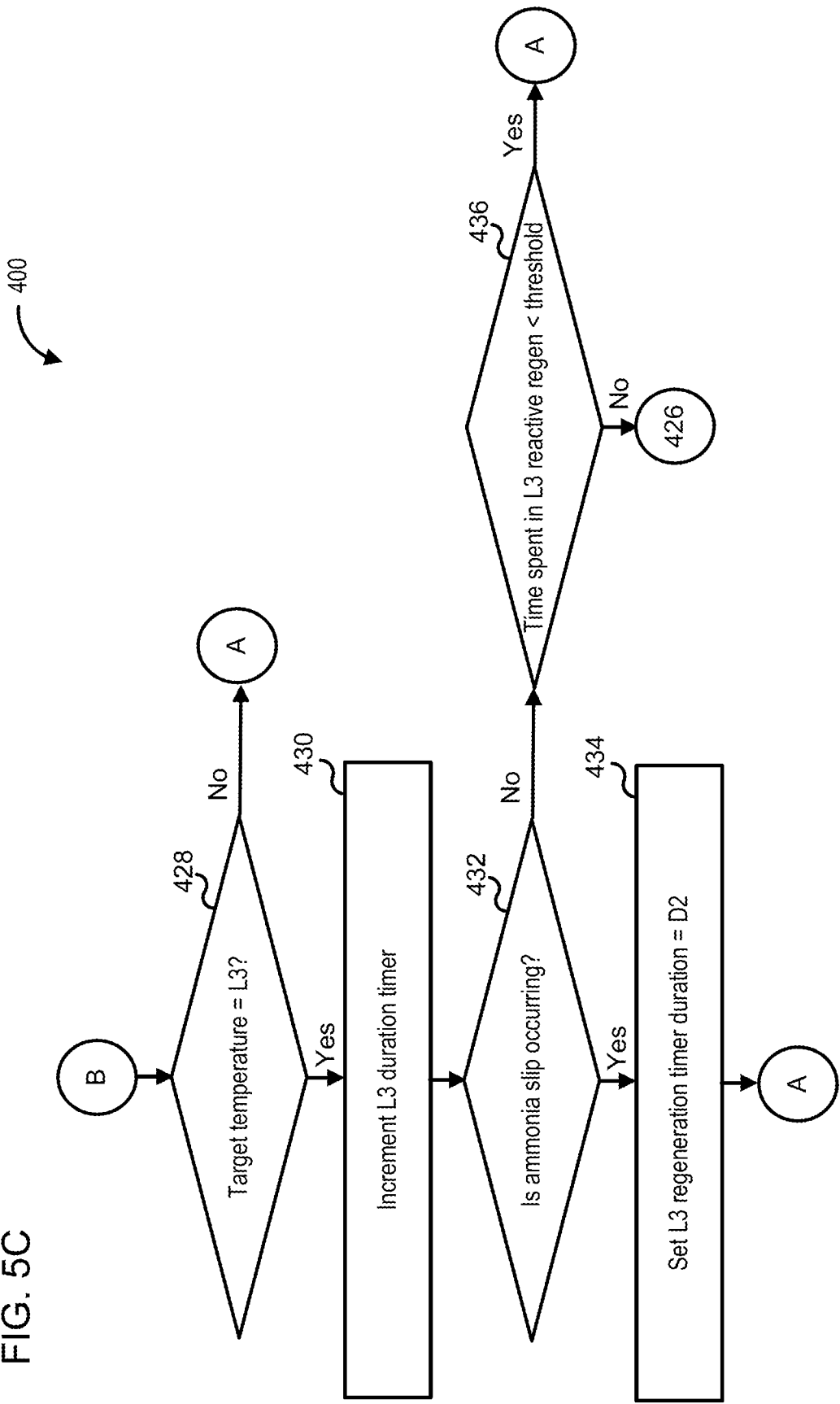

FIGS. 5A through 5C are flow charts showing a method 400 for reactive regeneration of a SCR catalyst included in an aftertreatment system, according to another embodiment. While the operations of the method 400 are described with respect to the controller 170 and the SCR catalyst 150 of the aftertreatment system 100, it should be understood that the operations of the method 400 can be implemented in any controller for use with any aftertreatment system.

The method 400 includes setting, by, the controller 170, a target temperature as a first regeneration temperature ("L1") (e.g., in a range of about 300-400 degrees Celsius), setting a time duration of L1 and a second regeneration temperature ("L2") as D2 (e.g., in a range of about 20 minutes to 40 minutes, inclusive), and setting a time duration of a high regeneration temperature ("L3") as D3 (e.g., in a range of about 5 minutes to 15 minutes), at 402.

At 404, the controller 170 determines whether reactive regeneration is active. If reactive regeneration is not active (404:NO), the method 400 ends. If the reactive regeneration is active (404:YES), the controller 170 determines if the SCR catalyst temperature is less than or equal to L1, at 406. At 408, the controller 170 determines if ammonia slip is occurring. If ammonia slip is not occurring (408:NO), the method returns to operation 402. If ammonia slip is occurring (408:YES), the controller 170 sets the target temperature as L2, at 410, and the operation then returns to operation 402.

In response to determining, by the controller 170 at 406, that the SCR catalyst temperature is greater than L1 (406:NO), the controller 170 determines whether the target temperature is equal to L2, at 412. In response to determining, by the controller 170, that the SCR catalyst temperature is equal to L2 (412:YES), the controller 170 determines whether the SCR catalyst temperature is less than or equal to L2, at 414. In response to the SCR catalyst temperature being less than or equal to L2 (414:YES), the controller 170 determines whether ammonia slip is occurring, at 416. In response to determining, by the controller 170, that the ammonia slip is occurring (416:YES), the controller 170 sets the regeneration time duration for L3 as D2, at 418. The method 400 then returns to operation 402.

If at 416, the controller 170 determines that the ammonia slip is not occurring (416:NO), the controller 170 determines whether a time interval since last regeneration of the SCR catalyst 150 at a temperature equal to or greater than L3, is greater than a time interval threshold, at 420. In response to the time interval being greater than the time interval threshold (420:YES), the controller 170 sets the target temperature as L3, at 422. The method 400 then returns to operation 402.

If at 420, the controller 170 determines that the time interval is less than the time interval threshold (420:NO), the controller 170 determines whether the time spent in reactive regeneration is greater than a time duration threshold, at 424.

In response to the time duration being greater than the time duration threshold (424:YES), the method 400 returns to operation 402. In response to the time duration being less than the time duration threshold (424:NO), the controller 170 stops reactive regeneration.

In response to the controller 170 determining at operation 412 that the target temperature is not equal to L2 (412:NO), or determining at operation 414 that the SCR catalyst temperature is greater than L2 (414:NO), the controller 170 determines whether the target temperature is equal to L3, at 428. If the target temperature is not equal to L3, the method 400 returns to operation 402. In response to the target temperature being equal to L3 (428:YES), the controller 170 increments an L3 duration timer, at 430. The controller 170 determines whether ammonia slip is occurring, at 432. In response to determining that ammonia slip is occurring (432:YES), the controller 170 sets an L3 regeneration timer duration as D2, at 434, and the method 400 then returns to operation 402. On the other hand, if the controller 170 determines that the ammonia slip is not occurring (432:NO), the controller 170 determines whether the time spent in reactive regeneration at L3 is less than a time duration threshold, at 436. In response to time spent being less than the time duration threshold (436:YES), the method 400 returns to operation 402. On the other hand, if the time spent is greater than the time duration threshold (436:NO), method 400 proceeds to operation 426, and the controller 170 stops reactive regeneration.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As used herein, the terms "about" and "approximately" generally mean plus or minus 10% of the stated value. For example, about 0.5 would include 0.45 and 0.55, about 10 would include 9 to 11, about 1000 would include 900 to 1100.

The term "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A controller for controlling regeneration of a selective catalytic reduction (SCR) catalyst of an aftertreatment system, the controller configured to:
   cause increase in a SCR catalyst temperature of the SCR catalyst to a first regeneration temperature, the first regeneration temperature being lower than a high regeneration temperature that is equal to or greater than 500 degrees Celsius;
   determine an amount of ammonia slip downstream of the SCR catalyst; and
   cause increase in the SCR catalyst temperature to a second regeneration temperature greater than the first regeneration temperature but less than the high regeneration temperature based on the determined amount of ammonia slip.

2. The controller of claim 1, further configured to:
   determine an amount of reductant deposits deposited on the SCR catalyst,
   wherein the controller is configured to cause the increase in the SCR catalyst temperature to the first regeneration temperature in response to the amount of reductant deposits being greater than a reductant deposit threshold.

3. The controller of claim 2, wherein the controller is configured to determine the amount of reductant deposits based on a SCR catalytic conversion efficiency of the SCR catalyst, an amount of reductant inserted into the aftertreatment system, and/or the amount of ammonia slip.

4. The controller of claim 1, further configured to:
   determine an amount of reductant deposits deposited on the SCR catalyst;
   in response to the amount of reductant deposits deposited on the SCR catalyst being less than a reductant deposit threshold, determine if a time interval since a previous high temperature regeneration is greater than a time interval threshold, the high temperature being greater than 500 degrees Celsius,
   wherein the controller is configured to cause the increase in the SCR catalyst temperature to the first regeneration temperature in response to the amount of reductant deposits being less than the reductant deposit threshold and the time interval being equal to or greater than the time interval threshold.

5. The controller of claim 1, further configured to:
   in response to the amount of ammonia slip after increasing the SCR catalyst temperature to the second regeneration temperature being greater than an ammonia slip threshold, maintain the SCR catalyst at the second regeneration temperature for a time period.

6. The controller of claim 1, further configured to:
in response to the amount of ammonia slip after increasing the SCR catalyst temperature to the second regeneration temperature being less than an ammonia slip threshold, cause an increase in the SCR catalyst temperature to the high regeneration temperature; and
maintain the SCR catalyst at the high regeneration temperature for a time period.

7. The controller of claim 1, further configured to:
in response to the amount of ammonia slip after increasing the SCR catalyst temperature to the second regeneration temperature being less than an ammonia slip threshold, determine if a time interval since a previous high temperature regeneration is greater than a time interval threshold;
in response to the time interval being less than the time interval threshold, wait until the time interval is equal to or greater than the time interval threshold;
cause increase in the SCR catalyst temperature to the high regeneration temperature; and
maintain the SCR catalyst at the high regeneration temperature for a time period.

8. The controller of claim 1, further configured to:
determine whether ammonia slip is occurring by:
determine a pre reactive regeneration SCR catalytic conversion efficiency of the SCR catalyst before increasing the SCR catalyst temperature to the first regeneration temperature,
set an ammonia to $NO_X$ ratio to 1,
determine a current SCR catalytic conversion efficiency of the SCR catalyst, and
responsive to a difference between the current SCR catalytic conversion efficiency and the pre reactive regeneration SCR catalytic conversion efficiency being less than a threshold, set a slip flag indicating that ammonia slip is occurring.

9. The controller of claim 8, further configured to:
responsive to determining that the difference is greater than the threshold, increment a no-slip duration timer;
determine a no-slip counter duration based on the no-slip duration timer; and
responsive to the no-slip counter duration being greater than a threshold, remove the slip flag.

10. An aftertreatment system, comprising:
a SCR catalyst;
a reductant insertion assembly configured to insert a reductant into the aftertreatment system; and
the controller according to claim 1.

11. A method for controlling regeneration of a selective catalytic reduction (SCR) catalyst of an aftertreatment system, the method comprising:
causing, by a controller, an increase in a SCR catalyst temperature of the SCR catalyst to a first regeneration temperature, the first regeneration temperature being lower than a high regeneration temperature that is equal to or greater than 500 degrees Celsius;
determining, by the controller, an amount of ammonia slip downstream of the SCR catalyst; and
causing, by the controller, an increase in the SCR catalyst temperature to a second regeneration temperature greater than the first regeneration temperature but less than the high regeneration temperature based on the determined amount of ammonia slip.

12. The method of claim 11, further comprising:
determining, by the controller, an amount of reductant deposits deposited on the SCR catalyst,
wherein the increase in the SCR catalyst temperature to the first regeneration temperature is caused, by the controller, in response to the amount of reductant deposits being greater than a reductant deposit threshold.

13. The method of claim 12, wherein the amount of reductant deposits are determined, by the controller, based on a SCR catalytic conversion efficiency of the SCR catalyst, an amount of reductant inserted into the aftertreatment system, and/or the amount of ammonia slip.

14. The method of claim 11, further comprising:
determining, by the controller, an amount of reductant deposits deposited on the SCR catalyst; and
in response to the amount of reductant deposits deposited on the SCR catalyst being less than a reductant deposit threshold, determining, by the controller, whether a time interval since a previous high temperature regeneration is greater than a time interval threshold, the high temperature being greater than 500 degrees Celsius,
wherein the increase in the SCR catalyst temperature to the first regeneration temperature is caused, by the controller, in response to the amount of reductant deposits being less than the reductant deposit threshold and the time interval being equal to or greater than the time interval threshold.

15. The method of claim 11, further comprising:
in response to the amount of ammonia slip after increasing the SCR catalyst temperature to the second regeneration temperature being greater than an ammonia slip threshold, maintaining, by the controller, the SCR catalyst at the second regeneration temperature for a time period.

16. The method of claim 11, further comprising:
in response to the amount of ammonia slip after increasing the SCR catalyst temperature to the second regeneration temperature being less than an ammonia slip threshold, causing, by the controller, an increase in the SCR catalyst temperature to the high regeneration temperature; and
maintaining, by the controller, the SCR catalyst at the high regeneration temperature for a time period.

17. The method of claim 11, further comprising:
in response to the amount of ammonia slip after increasing the SCR catalyst temperature to the second regeneration temperature being less than an ammonia slip threshold, determining, by the controller, if a time interval since a previous high temperature regeneration is greater than a time interval threshold;
in response to the time interval being less than the time interval threshold, waiting, by the controller, until the time interval is equal to or greater than the time interval threshold;
causing, by the controller, an increase in the SCR catalyst temperature to the high regeneration temperature; and
maintaining, by the controller, the SCR catalyst at the high regeneration temperature for a time period.

18. A method, comprising:
determining, by a controller, a pre reactive regeneration SCR catalytic conversion efficiency of a SCR catalyst before increasing a SCR catalyst temperature to a first regeneration temperature;
setting, by the controller, an ammonia to $NO_X$ ratio to 1;
determining, by the controller, a current SCR catalytic conversion efficiency of the SCR catalyst; and
responsive to a difference between the current SCR catalytic conversion efficiency and the pre reactive regeneration SCR catalytic conversion efficiency being less than a threshold, setting, by the controller, a slip flag indicating that ammonia slip is occurring.

19. The method of claim 18, further comprising:
responsive to the difference being less than the threshold, decreasing, by the controller, the ammonia to $NO_X$ ratio by an offset.

20. The method of claim 18, further comprising:
responsive to determining that the difference is greater than the threshold, incrementing, by the controller, a no-slip duration timer.

21. The method of claim 20, further comprising:
determining, by the controller, a no-slip counter duration based on the no-slip duration timer;
responsive to the no-slip counter duration being greater than a threshold, removing, by the controller, the slip flag, and setting, by the controller, the ammonia to $NO_X$ ratio to 1.

\* \* \* \* \*